Figure 1:
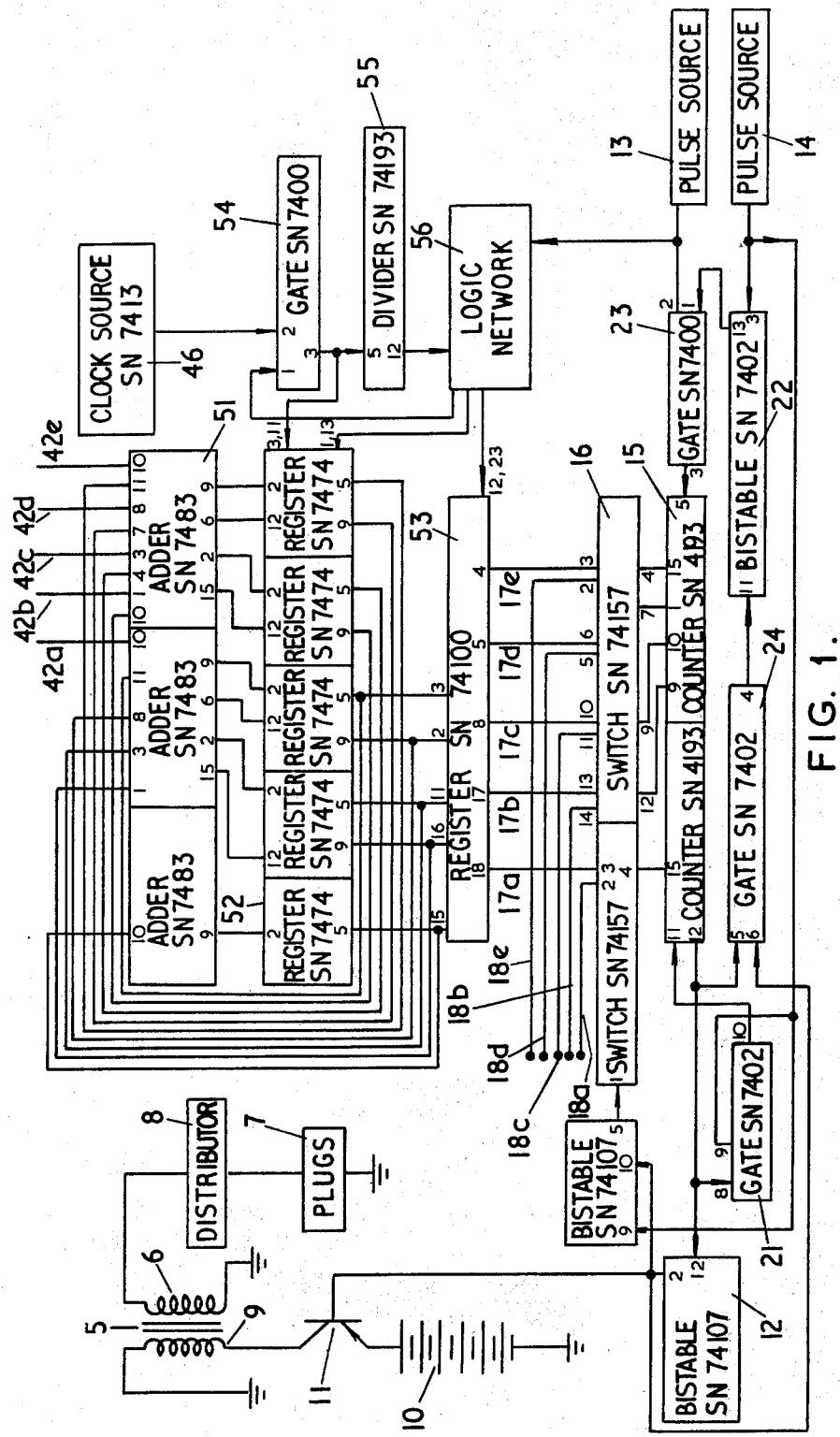

United States Patent [19]

Ives et al.

[11] 3,998,193
[45] Dec. 21, 1976

[54] SPARK IGNITION SYSTEMS

[75] Inventors: Andrew Peter Ives, Solihull; Duncan Barry Hodgson, Leamington Spa; Michael Herbert Cops, Solihull, all of England

[73] Assignee: Joseph Lucas (Electrical) Limited, Birmingham, England

[22] Filed: Feb. 23, 1976

[21] Appl. No.: 660,364

Related U.S. Application Data

[63] Continuation of Ser. No. 492,329, July 26, 1974, abandoned, which is a continuation-in-part of Ser. No. 311,426, Dec. 1, 1972, abandoned.

[30] Foreign Application Priority Data

Dec. 21, 1971 United Kingdom ............ 59504/71

[52] U.S. Cl. .................. 123/117 R; 123/146.5 A; 123/148 E
[51] Int. Cl.² ........................................ F02P 5/04
[58] Field of Search ............... 123/117 R, 146.5 A, 123/148 E

[56] References Cited

UNITED STATES PATENTS

| | | | |
|---|---|---|---|
| 3,592,178 | 7/1971 | Schiff | 123/148 E |
| 3,677,255 | 7/1977 | Withem | 123/148 E |
| 3,696,303 | 10/1972 | Hartig | 123/148 E |
| 3,749,073 | 7/1973 | Asplund | 123/117 R |
| 3,757,755 | 9/1973 | Caines | 123/117 R |
| 3,835,819 | 9/1974 | Anderson | 123/117 R |

*Primary Examiner*—Charles J. Myhre
*Assistant Examiner*—Paul Devinsky

[57] ABSTRACT

A spark ignition system for a vehicle produces pulses representing the engine crankshaft angle. These pulses are counted, and compared with a datum signal which varies in accordance with engine conditions. When the two signals compared are equalled, then a spark is produced.

5 Claims, 6 Drawing Figures

3,998,193

SPARK IGNITION SYSTEMS

This is a continuation of application Ser. No. 492,329, filed July 26, 1974, now abandoned, which is a continuation-in-part of Ser. No. 311,426, filed Dec. 1, 1972, now abandoned.

This invention relates to spark ignition systems for vehicles, particularly road vehicles.

A system according to the invention comprises in combination a semi-conductor switch drivable between first and second states in one of which said switch is on and in the other of which said switch is off, means operable when said switch is driven from said first state to said second state for producing a spark, first and second transducers producing electrical outputs representing first and second system parameters respectively, a programmed memory device coupled to said transducer, said memory device producing a digital output signal which varies with the outputs from said transducers and the value of which at any instant represents the required ignition timing angle, measured from a datum position of the engine crankshaft, a pulse source controlled by the engine crankshaft for producing a train of pulses starting from said datum position so that the number of pulses in the train represents crankshaft angle starting from said datum position, and spark control means operable when the number of pulses in a train becomes equal to said digital output signal for driving said switch from said first state to said second state to produce a spark.

Preferably the pulse source controlled by the engine crankshaft serves to produce a control pulse followed by a succession of timing pulses, the control pulse being used to set said datum position and the timing pulses constituting the train of pulses, the number of control pulses followed by successions of timing pulses produced for each revolution of the engine crankshaft being equal to the number of sparks required for each revolution of the engine crankshaft.

In the preferred arrangement, the digital output signal is fed to a register which stores the digital output signal, said spark control means including a comparator arrangement which receives the timing pulses, and also has transferred to it from time to time the contents of the register. Preferably, transfer of information from the register to the comparator arrangement is inhibited during receipt of a control pulse. This inhibition is conveniently achieved by ensuring that the pulse source controlled by the engine crankshaft does not produce a timing pulse at the same time as a control pulse, and using the timing pulses to effect the required transfer of information from the register to the comparator arrangement.

Preferably, the means driving the switch from its first state to its second state includes a bistable circuit, and means is provided for driving the bistable circuit back to its original state after a spark is produced, so that the switch reverts to its first state. This means may produce a second digital signal representing the control angle (as hereinafter defined), the second digital signal being compared with the number of timing pulses occurring after the switch is driven from its first state to its second state, and the bistable circuit being driven back to its original state when the counts are equal.

In another aspect, the invention resides in a spark ignition system for a road vehicle in which a semi-conductor switch is connected in series with the primary winding of the ignition coil of the vehicle, and digital control means operable by the engine is provided for turning the switch off to produce a spark at an instant representing ignition timing angle, and for turning the switch on at an instant representing ignition control angle, the digital control means operating by obtaining digital signals representing the desired timing and control angles, and comparing these signals with a digital signal representing crankshaft angle.

Figure 2:
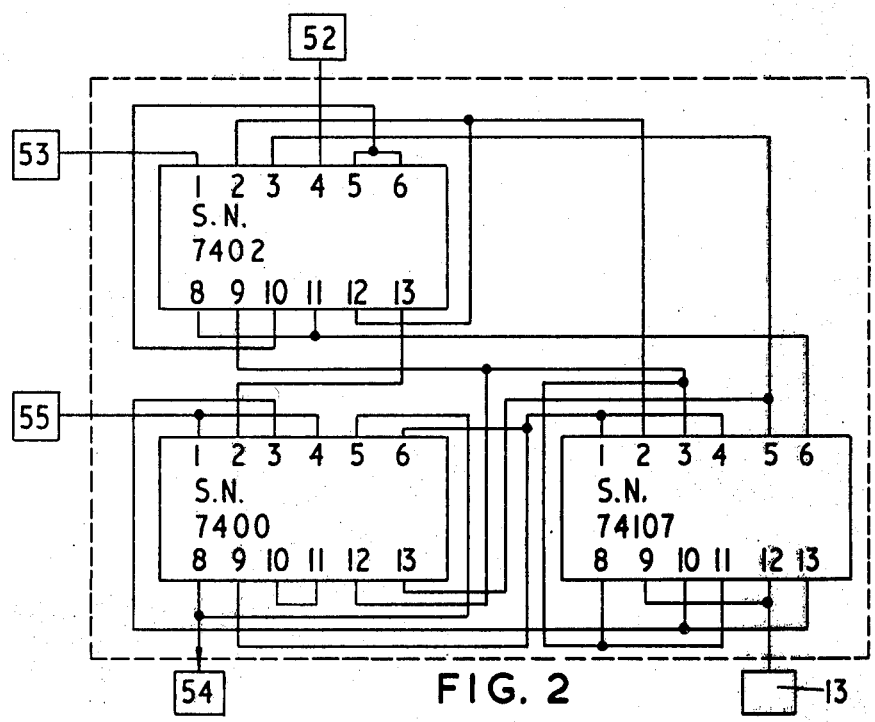
Figure 6:
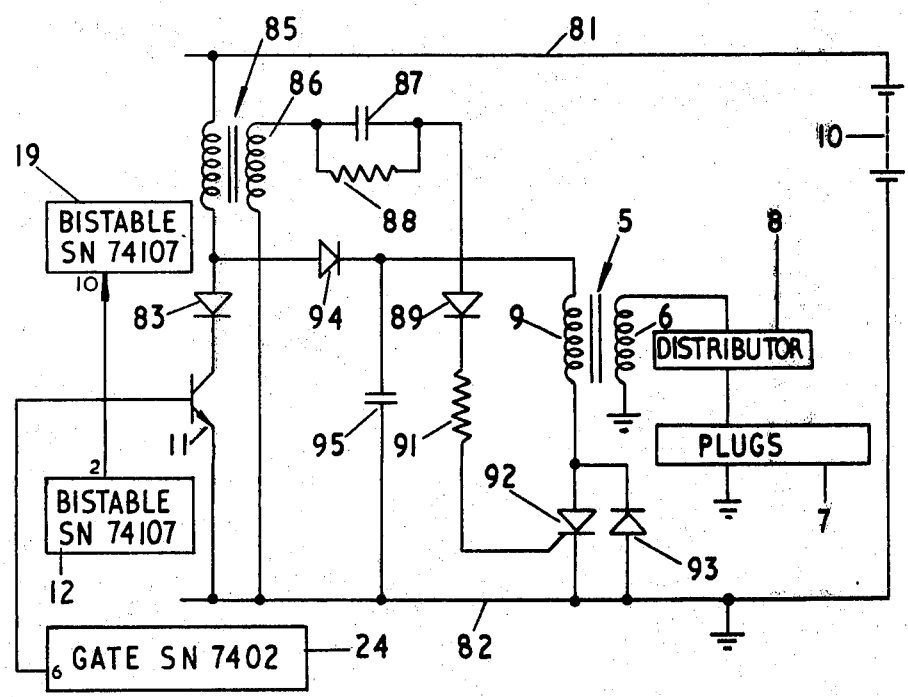
Figure 3:
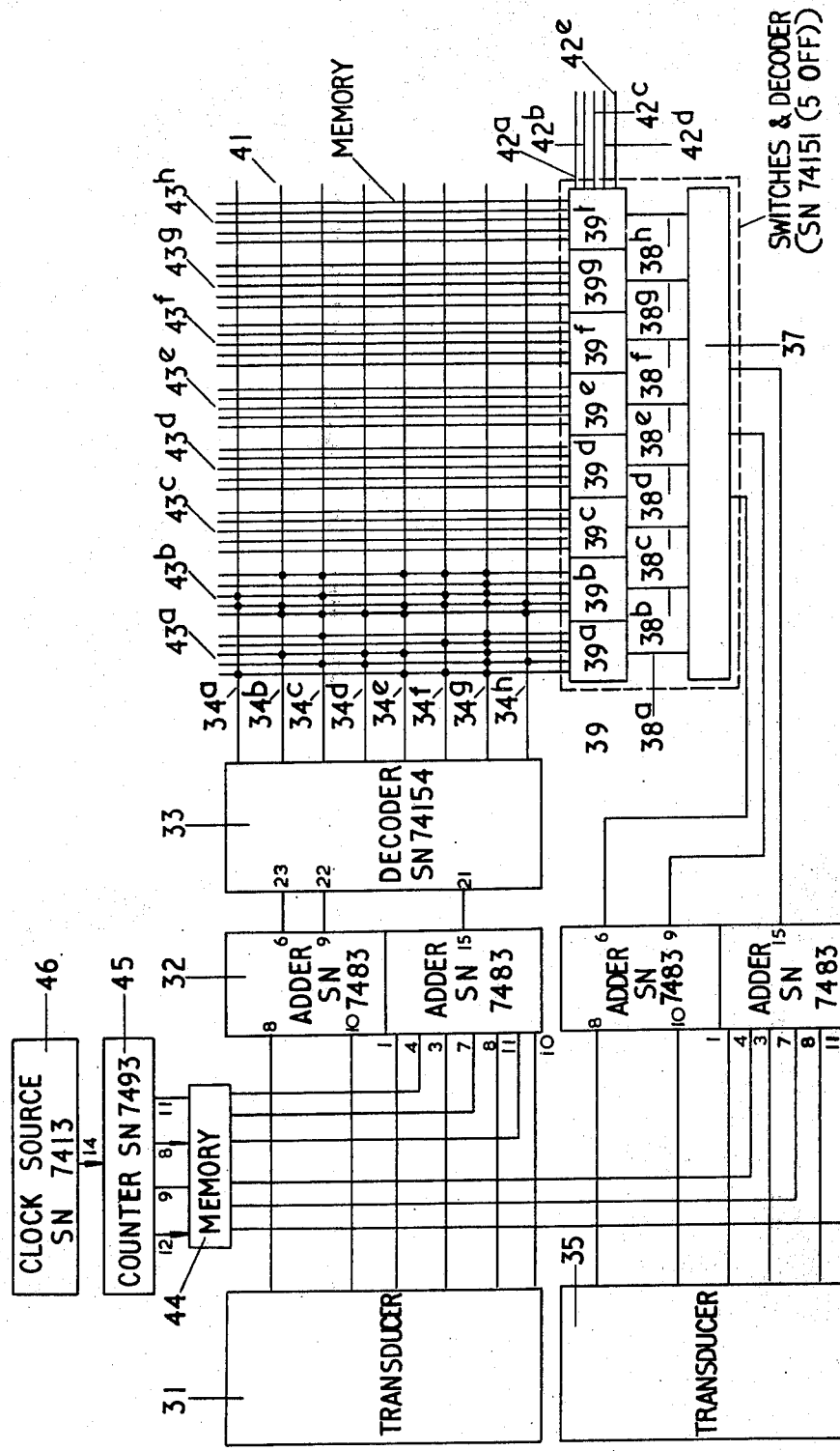
Figure 4:
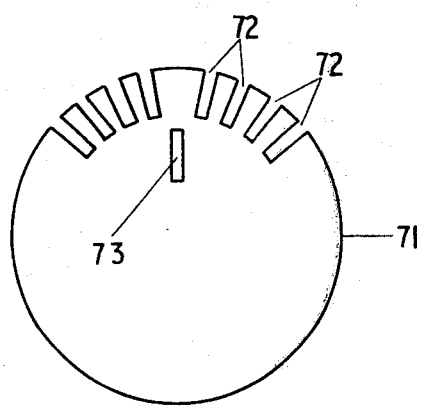

In the accompanying drawings,

FIGS. 1, 2 and 3 are block diagrams which show respective parts of a system according to one example of the invention and which, by way of illustration, gives for the various blocks the serial numbers of suitable components supplied by Texas Instruments Limited and the interconnections between the components, FIG. 4 is a diagrammatic view of one form of pulse producing device which can be used in the example shown in FIGS. 1, 2 and 3, FIG. 5 is a side view of FIG. 4, and FIG. 6 illustrates part of another example.

The engine to be controlled has a spark ignition system including an ignition transformer 5 the secondary winding 6 of which is connected to the plugs 7 of the engine in turn through a distributor 8, and the primary winding 9 of which is connected to the vehicle battery 10 through the collector-emitter path of a p-n-p transistor 11. When a spark is required, the transistor 11 is turned off, and after the production of a spark, the transistor 11 is turned on again. It will be appreciated that the instant at which the transistor is turned off represents the ignition timing angle, which must of course be measured relative to a datum position of the engine crankshaft. The time for which the transistor remains off is controlled by determining the instant at which the transistor is turned on again. The importance of the ignition timing angle, that is to say the point in the engine cycle at which the transistor is turned off relative to the datum position, is of course well known, and is of great significance in engine performance. It is also highly desirable to control the duration of time for which the transistor remains off (which duration is referred to throughout the specification as the control angle) so that the time for which the transistor conducts before it turns off again is just sufficient to ensure that the required current flows in the primary winding 9 at the instant when the transistor 11 is turned off again to produce the spark. In this way, unnecessary dissipation of power is prevented. Moreover, by varying the control angle, the actual duration of the spark can in certain circumstances be shortened. Thus, if while a spark is still being produced the transistor 11 is turned on again, then clearly the spark will be rapidly terminated.

The transistor 11, which could of course be any other suitable semi-conductor device, is controlled by a bistable circuit 12 (Texas Instruments integrated device type SN 74107). When the bistable circuit is in a first state, the transistor receives base current and is on. When the bistable circuit 12 is in a second state, the transistor 11 does not receive base current and is off.

Figure 5:
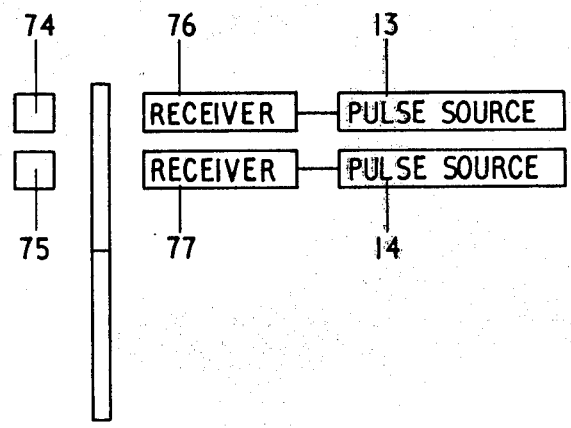

In order to establish the required datum position of the crankshaft, a disc 71 (FIGS. 4 and 5) is provided which is driven by the crankshaft of the engine. Assuming for simplicity that the engine has two cylinders, and one spark is produced per crankshaft revolution, then the disc is divided into 360 sectors each subtending 1°, and 359 of these sectors are provided with a radially extending slot 72 at the periphery of the sector. The last sector does not have a peripheral slot, but has a radial datum slot 73 disposed radially inwards from the periphery. The slots are equiangularly spaced, and the number of datum slots 73 is equal to the number of sparks to be produced by the engine per engine crankshaft revolution, which in the simple example shown is one. Associated with the disc is any convenient means for producing pulses under the control of the slots. As shown in FIG. 5, this means could comprise a pair of light sources 74, 75 and associated light receivers 76, 77 respectively, the source 74 and receiver 76 being disposed on opposite sides of the slots 72, and the source 75 and receiver 77 being disposed in alignment with the slot 73. Each time a slot passes between one of the sources and its associated receiver, the receiver receives an input, and the receivers 76, 77 are connected to a pair of pulse sources 13, 14 respectively so that each of the sources 13, 14 produces a pulse each time that one of the slots 72 and 73 allows light to fall on the appropriate receiver 76 or 77. Thus, in the two cylinder arrangement described for simplicity, the pulse source 14 produces one pulse each revolution of the disc 71, and after a pulse is produced by the pulse source 14, then the pulse source 13 will produce 359 pulses, after which there will be another pulse from the source 14 and so on. The disc is arranged in relation to the crankshaft of the engine so that the pulse source 14 produces its output at some convenient position, for example about 40° to 60° before top dead centre. By arranging the disc in this way, it is only necessary to consider retard in ignition angle relative to the datum position, since an advance in the ignition angle relative to top dead centre will still be a retard relative to the datum position. It is to be understood that the exact way in which the pulses are produced is not important to an understanding of the invention, and clearly numerous other arrangements different from that shown could be employed for this purpose.

The ignition system includes a comparator arrangement in the form of a binary counter 15 (defined by two Texas Instruments integrated devices type SN 74193 having their 11 terminals ganged) which receives a five-bit input under the control of a switching unit 16 (defined by 2 Texas Instruments integrated devices type SN 74157 having their 1 terminals ganged) either from five lines 17a to 17e or five lines 18a to 18e. The way in which the information is received on the lines 17 and 18 will be described in detail later, but for the moment it is sufficient to know that the binary signal on the lines 17a to 17e represents the required ignition timing angle (relative to the datum position as previously explained), whilst the signal on the lines 18a to 18e represents the control angle. At the commencement of a cycle, the pulse source 14 produces an output which is fed to an OR gate 21 (Texas Instruments integrated device type Sn 7402), causing the gate 21 to produce an output which is fed to the counter 15 to couple the counter 15 to the switch 16. At this stage the switch 16 will be connected to the lines 17a to 17e and so the counter 15 is fed with the information on the lines 17a to 17e and stores this information. At the same time, the pulse source 14 sets a bistable circuit 22 (Texas Instruments integrated device type SN 7402) to a first state in which it provides an output to a gate 23 (Texas Instruments integrated device type SN 7400) connected to the pulse source 13. The pulse source 13 now feeds the counter 15. It should be noted that at this stage the transistor 11 is conductive. The end of the pulse from the source 14 switches a bistable circuit 19 (Texas Instruments integrated device type SN 74107) which in turn sets the switch 16 so that the output from the switch 16 is connected to the lines 18a to 18e.

The counter 15 now contains a binary signal representing the required ignition timing angle plus the basic count stored in the counter 15 (usually zero). Each pulse from the source 13 is counted into the counter 15, reducing the signal in the counter 15 until the counter 15 reaches its basic count. When this stage is attained, the counter 15 produces an output pulse. The leading edge of this output pulse is passed to the OR gate 21 which produces an input to the counter 15 causing the counter 15 to re-load through the switch 16 with the information on the lines 18a to 18e. The trailing edge of the same pulse switches the bistable circuit 12 which in turn produces an output to the transistor 11 causing the transistor 11 to be turned off and a spark to be produced. The output of the bistable circuit 12 is also fed to the bistable circuit 19 which changes to a state whereby the output from the switch 16 is connected to the lines 17a to 17e again. The complementary output of the bistable circuit 12 is fed to an AND gate 24 (Texas Instruments integrated device type SN 7402) so that the next output pulse from the counter 15 is allowed to pass to the bistable circuit 22. The pulse source 13 continues to provide pulses to the counter 15 until the counter 15 reaches its basic count, at which point a second output pulse is produced by the counter 15. The leading edge of this pulse is passed to the OR gate 21 which produces an input to the counter 15 causing the counter 15 to re-load with the information on the lines 17a to 17e. The output pulse from the counter 15 is also passed through the now open gate 24 to the bistable circuit 22 so that the gate 23 is blocked. The trailing edge of the output pulse for the counter 15 switches the bistable circuit 12 again, turning the transistor 11 on. The bistable circuit 19 is unaffected by this change of state of the bistable circuit 12. The changing of the output of bistable circuit 12 also recloses the AND gate 24. The system is now in the original state, with the transistor 11 conducting and the counter 15 no longer receiving pulses from the source 13. The receipt of a further pulse from the source 14 then recommences the cycle.

It will be noted that when the transistor 11 is turned on again by the second output from the counter 15, the OR gate 21 will have caused the counter 15 to be re-loaded with the information on the lines 17a to 17e. The counter 15 is then again loaded when the source 14 produces an output by virtue of the connection from the source 14 to the OR gate 21. A preliminary loading of the counter 15 by the second output pulse from the counter 15 is not of course necessary, although it does not matter. If desired, the circuit can be designed so that the OR gate 21 is operated only by the first output pulse from the counter 15.

From the above description, it will be seen that the ignition timing angle is controlled in accordance with the signal on the lines 17a to 17e, whilst the control angle is controlled in accordance with the signal on the lines 18a to 18e. The way in which the signal on the lines 17a to 17e is produced will now be described, with reference first to FIG. 3.

Referring to FIG. 3, a transducer 31 produces a six-bit digital output representing either engine manifold depression or throttle angle. The output from the transducer 31 is fed to an adder 32 (defined by two Texas Instruments integrated devices type SN 7483), and the three most significant digits from the adder 32 are fed to a decoder 33 (Texas Instruments integrated device type SN 74154) which produces a signal on one of eight lines 34a to 34h. Another transducer 35 produces a six-bit digital output representing engine speed, and this output is fed to an adder 36 (also defined by two Texas Instruments integrated devices type SN 7483), the three most significant digits of which are fed to a decoder 37 which energises one of eight lines 38a to 38h associated with a switching device 39 having eight sets of switches 39a to 39h respectively. The decoder 37, lines 38 and device 39 are defined by five Texas Instruments integrated devices type SN 74151 each of which has its 9, 10 and 11 terminals connected to three output lines respectively of the adder 36; its 4, 3, 2, 1, 15, 14, 13 and 12 terminals connected to one line of eight sets of lines 43a to 43h respectively; and its 6 terminal connected to one of five output lines 42a to 42e of a programmed memory unit 41. The arrangement is such that each of the lines 38 when energised serves to operate its associated switch 39, which in turn connects one of the eight sets of lines 43a to 43h to the output lines 42a to 42e. Each set of lines 43 consists of five lines which are connected to the lines 42a to 42e respectively when the associated switch 39 is closed, and each of the lines 34 is connected to certain of the lines 43 and in an empirically determined manner through diodes. In the drawing, dotted connections are shown between the first two sets of lines 43a and 43b and the lines 34, and each dot represents a diode. The connections shown are random, and will of course be determined for the particular engine being controlled in accordance with the required timing characteristics of the engine. By way of example, suppose that the parameter detected by the transducer 35 has a value such that the line 38a is energised then the switch 39a is closed to connect the set of lines 43a to the output lines 42a to 42e respectively. If a connection is indicated by 1 and no connection by 0, then if the parameter detected by the transducer 31 has a value such that the line 34a is energised, the signal appearing on the output lines 42e to 42e will be 10000. If the parameter detected by the transducer 31 changes such that the lines 34b to 34h are energised in turn, with the line 38a still held energised, then the signal on the lines 42a to 42e will become successively 00100, 01001, 01100, 10100, 10010, 11111 and 01000. Thus, it will be seen that the memory unit 41 produces an output on the lines 42a to 42e which is predetermined for the values of the two parameters being detected at any given instant.

For the sake of simplicity, components 44, 45 and 46 have for the moment been ignored. The component 44 is a diode read-only memory which is connected to the three least significant digits of a second set of inputs to each of the adders 32 and 36, and is itself fed by a counter 45 (Texas Instruments integrated device type SN 7493) which receives pulses from a clock source 46 (Texas Instruments integrated device type SN 7413). Assuming for the moment that the parameters detected by the transducers 31 and 35 are constant, and the reading in the counter 45 is zero, then the counter 45 receives pulses from the source 46 and acts through the decoder 44 to alter the three least significant digits applied to the adders 32 and 36. Although simple connections are shown in FIG. 3, in fact the arrangement is such that the memory 44 operates on a cycle of 16 pulses and adds to the adder 32 in turn the following numbers in digital form: 1 2 3 4 5 6 7 8 8 7 6 5 4 3 2 1. At the same time, the following numbers are added to the adder 36 in digital forms: 5 6 7 8 8 7 6 5 4 3 2 1 1 2 3 4.

The effect of this technique, which is known as interpolation, may or may not be to alter the three most significant digits passed from the adders 32 and 36 to the decoders 33 and 37, depending on the particular values of the three least significant digits from the transducers 31 and 35 at any given moment. Thus, assuming constant values for the two parameters detected by the transducers 31 and 35, the lines 42a to 42e will present sixteen sequential sets of information in a cycle. This technique enables more accurate information to be produced from the programmed memory unit 41.

Reverting now to FIG. 1, the lines 42a to 42e provide information to an adder 51 (defined by three Texas Instruments integrated devices type SN 7483) which in turn provides information to a register 52 (defined by the five Texas Instruments integrated devices type SN 7474 with the 3, 11 terminals of all the devices being interconnected and the 1, 13 terminals also being interconnected) the output from which is fed to a register 53 (defined by Texas Instruments integrated device type SN 74100) from which extend the lines 17a to 17e. The output from the register 52 is also fed back to the input to the adder 51. The clock source 46 provides an input to a gate 54 (Texas Instruments integrated device type SN 7400), the output from which is fed to a dividing counter 55 (Texas Instruments integrated device type SN 74193), having its output connected in turn to a logic network 56 which also receives an input from the pulse source 13. The arrangement of the network 56 is shown in FIG. 2 from which it will be seen that the network consists of Texas Instrument integrated devices types SN 7402, SN 7400 and SN 74107 interconnected as illustrated.

Remembering that the output from the programmed memory unit 41 changes, for given values of the input parameters, 16 times in a cycle, then it will be seen that the clock source 46 will, each time it produces a pulse, cause the gate 54 to apply a signal to the register 52 so that the register 52 reads the output from the adder 51. The next pulse from the source 46 causes this operation to occur again, but this time the register 52 will receive the sum of the signal fed to the adder 51 by the lines 42, and the previous reading of the register 52, which was of course the signal previously fed to the adder 51 by the lines 42. In other words, the register 52 gradually builds up a signal representing the sum of n signals applied to the lines 42, where n increases incrementally from 1 to 16. This signal will of course increase so that the output from the register 52 will require nine output lines. Of these nine lines, the five most significant are fed to the register 53. Thereby resulting in the average value of sixteen readings being calculated.

The five most significant bits of the signal in the register 52 is received continuously by the register 53 but are not passed on continuously by the register 53 to the lines 17. When 16 pulses have passed through the gate 54, the counter 55 provides an output to the logic network 56 which in turn provides an output shutting off the gate 54. The logic network 56 now remains in a conditioned state without taking any action until the next pulse is received from the source 13. On receipt of a pulse from the source 13, the logic network 56 provides an output to the register 53, causing the signal on the input of the register 53 to be stored and transferred to the lines 17a to 17e. On receipt of a second pulse from the source 13, the logic network 56 provides a signal to the register 52 to clear the register 52. On receipt of a third pulse from the source 13, the logic network applies a signal to the gate 54 to re-open the gate 54 so that the clock source 46 repeats the cycle of operations.

It will of course be appreciated that the sampling of the programmed memory unit 41 may take place very quickly, and the information on the lines 17a to 17e may be updated a large number of times between pulses from the pulse source 14. The updated information will not of course always be used, but the arrangement ensures that when the source 14 produces a pulse, the latest available information is present on the lines 17a to 17e.

A particularly useful features of the arrangement described is that information cannot be transferred to the lines 17a to 17e at an inconvenient moment, that is to say when the source 14 is just producing its output. The reason for this is that because the logic network 56 is operated by pulses from the source 13, then the absence of a pulse from the source 13 when a pulse is produced by the source 14 ensures that if, for example, the sixteenth pulse from the clock source 46 arrives after the 359th pulse from the source 13 but before the pulse from the source 14, then the transfer of information from the register 53 to the lines 17a to 17e will not take place until the first pulse in the next cycle of the pulse source 13.

Information may be fed to the lines 18a to 18e in exactly the same way as described with reference to the lines 17a to 17e. In other words, the outputs from the decoders 33 and 37 can be fed to a further programmed memory unit of the same form as the programmed memory unit disclosed but with different connections to suit the requirement for the control angle. The output from this further programmed memory unit will then be fed through an arrangement similar to that described with reference to the units 51 to 56. However, in many cases the control angle is considerably simpler than that for the timing angle, and it is possible to take the output from the transducer 35 to a simple logic network which provides a signal to the lines 18.

Referring now to the modification shown in FIG. 6, this arrangement is for use with a capacitor discharge type ignition system, and the arrangement is as shown in FIG. 1 except for the ignition circuit itself. The bistable circuit 12 is shown in FIG. 6, and it will be noted that the transistor 11 now receives base current when the bistable circuit 12 is in its second state. In other words, the transistor 11 is now turned on to produce a spark, rather than off as in FIG. 1.

In FIG. 6, the vehicle battery 10 provides power to positive and negative lines 81, 82. The transistor 11 has its emitter connected to the line 82 and its collector connected to the line 81 through a diode 83 in series with the primary winding 84 of a transformer 85. The transformer 85 has a secondary winding 86 one end of which is connected to the line 82, and the other end of which is connected through a capacitor 87 and a resistor 88 in parallel to the anode of a diode 89, the cathode of which is connected through a resistor 91 to the gate of a thyristor 92. The thyristor 92 has its anode-cathode bridged by a diode 93, and its anode connected to the anode of the diode 83 to the primary winding 9 of the ignition transformer 5, and a diode 94 in series. The secondary winding 6 of the transformer 5 is connected through the distributor 8 to the plugs 7 in turn. Finally, the junction of the winding 9 and diode 94 is connected through a capacitor 95 to the line 82.

When the transistor 11 is on, energy is stored in the winding 84. When the transistor 11 is turned off, this energy is transferred by way of the diode 94 to the capacitor 95. When the transistor 11 is turned on again, the signal induced in the winding 86 turns on the thyristor 92, whereupon the capacitor 95 discharges through the winding 9 and the thyristor 92 can produce the required spark. Energy is again stored in the winding 84, and the cycle is repeated.

It will be appreciated that the bistable circuit 12 effects the required control in exactly the same was as in FIG. 1, except of course that where in FIG. 1 the transistor 11 is turned off, in FIG. 6 it is turned on, and there in FIG. 1 the transistor 11 is turned on, in FIG. 6 it is turned off. Of course, in the arrangement of FIG. 6, the on period of the transistor 11 need only be for a period sufficient to store the required amount of energy in the winding 84, and the period of conduction of the transistor 11 is selected accordingly. In other words, in FIG. 1 the transistor 11 must be turned on sufficiently far in advance of the production of a spark to store the required amount of energy. In FIG. 6, the transistor 11 is on when the spark is produced, and must be kept on long enough to store the required amount of energy.

We claim:

1. A spark ignition system for an internal combustion engine, comprising:
   a semi-conductor switch drivable between first and second states, in one of which states said switch is on and in the other of which states said switch is off;
   means operable to produce a spark in response to said switch being driven from said first state to said second state;
   a pulse source means controlled by the engine crankshaft for producing both a control pulse when the crankshaft is in a predetermined datum position and a succession of timing pulses following each control pulse;
   digital control means including first means for producing a first digital output signal which at any given instant represents the angle between said datum position and the crankshaft angle, starting from said datum position, at which the spark is required, and second means for producing a second digital output signal representing the crankshaft angle, starting from said datum position, at which said switch is required to be driven from said second state to said first state;
   said first means including first and second transducer means for producing electrical outputs representing first and second operating parameters respectively of the engine, and a programmed memory device coupled to said transducers, said memory device producing said first digital output signal;
   comparator means connected to said digital control means;
   first bistable circuit means connected to said pulse source and operable in response to each control pulse for loading said comparator means with said first digital output signal, said comparator means producing a first output signal for driving said semi-conductor switch from said first state to said second state when the number of timing pulses received by said comparator means following the control pulse is equal to said first digital output signal; and second bistable circuit means for feeding said second digital output signal to said comparator means to produce a second output signal for driving said semi-conductor switch from said second state to said first state when the number of timing pulses received following the control pulse equals said second digital output signal.

2. A spark ignition system as claimed in claim 1 wherein said first and second transducer means produce electrical outputs representing engine manifold depression and throttle angle.

3. A spark ignition system as claimed in claim 1 wherein said first and second transducer means produce electrical outputs representing engine manifold depression and engine speed.

4. A spark ignition system as claimed in claim 1 wherein said first and second transducer means produce electrical outputs representing throttle angle and engine speed.

5. A spark ignition system as claimed in claim 1 wherein said means operable to produce a spark includes a circuit interconnecting a capacitor and a second semi-conductor and an inductor.

* * * * *